United States Patent
Quigley et al.

[15] 3,675,752
[45] July 11, 1972

[54] DIRECTIONAL GRAIN CHUTES

[72] Inventors: Norman R. Quigley; Marvin E. Hansen, both of Rouleau, Saskatchewan, Canada

[22] Filed: Oct. 20, 1970

[21] Appl. No.: 82,331

[52] U.S. Cl. ..................................193/5, 193/25 A, 298/7
[51] Int. Cl. ..................................B65g 11/10, B60p 1/00
[58] Field of Search ..........................105/279; 193/4, 5–6, 193/33, 34, 2 C, 25 A; 222/527, 529, 530; 296/50, 61; 298/7

[56] References Cited

UNITED STATES PATENTS

| | | | |
|---|---|---|---|
| 2,249,897 | 7/1941 | Hammill | 193/25 A |
| 355,994 | 1/1887 | Horwitz | 193/25 |
| 759,295 | 5/1904 | Miller | 193/25 A |
| 2,678,121 | 5/1954 | Phillips | 193/4 |
| 109,088 | 11/1870 | Williams | 193/4 |
| 955,519 | 4/1910 | Lazarus | 222/527 |

*Primary Examiner*—Richard E. Aegerter
*Assistant Examiner*—W. Scott Carson
*Attorney*—Kent & Ade

[57] ABSTRACT

A rectangular-shaped apron of flexible material having one side fastened across the rear of a grain truck and directly under the end gate thereof, while the free corners of the apron are adjustable suspended from brackets on the truck wall, and such that the apron can be flexed to form a chute and direct grain pouring from under the opened end gate in the direction desired.

2 Claims, 3 Drawing Figures

PATENTED JUL 11 1972 3,675,752
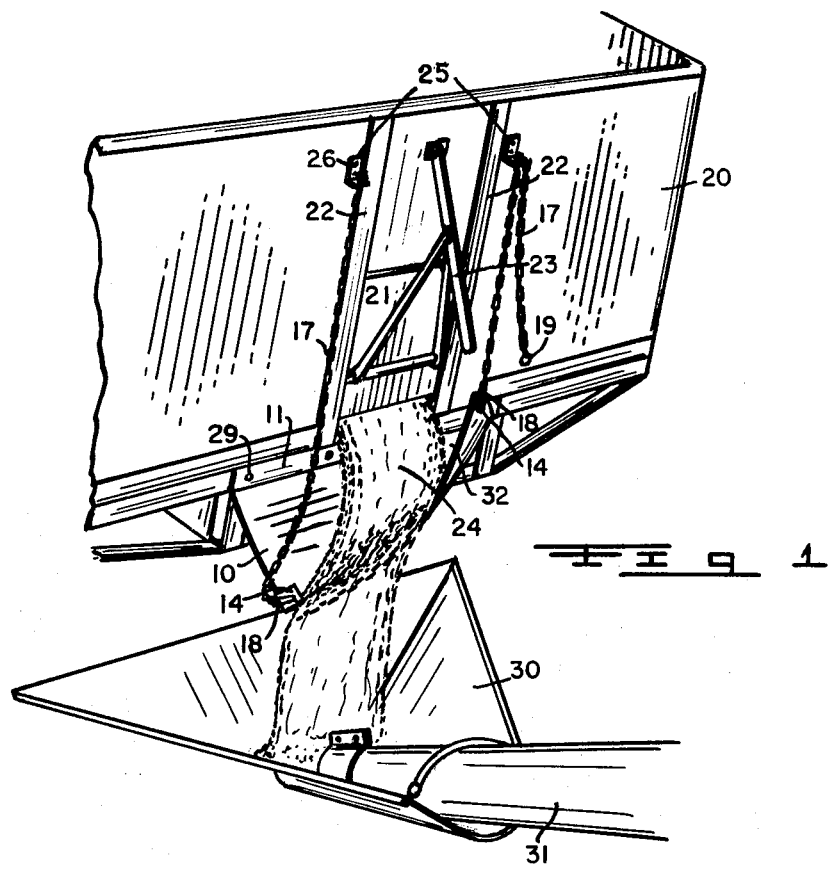
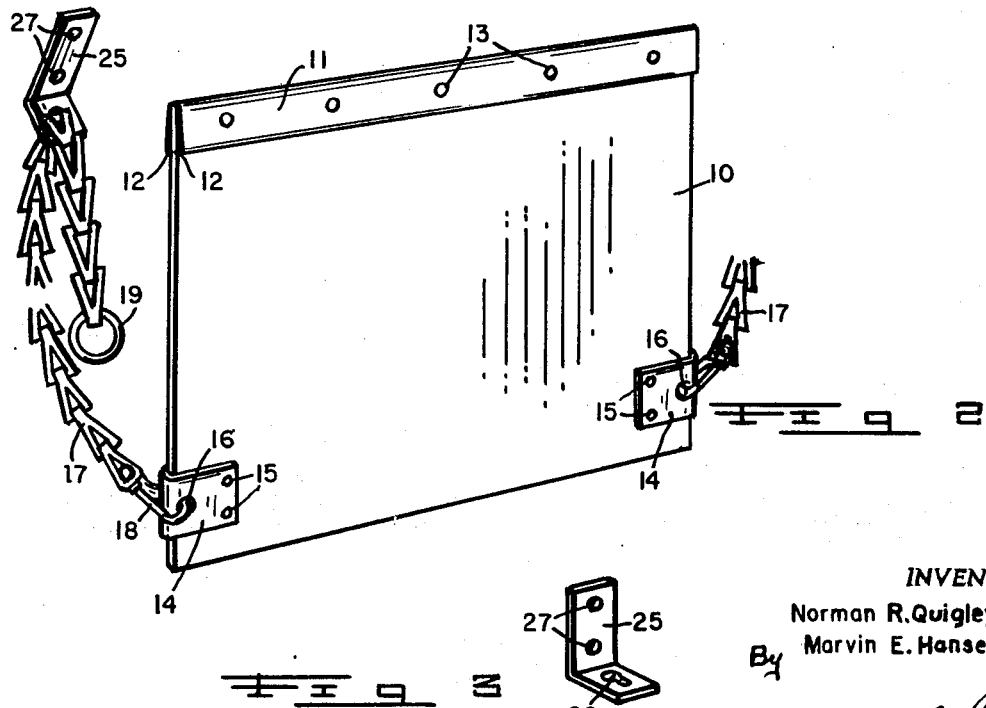
INVENTORS
Norman R. Quigley
Marvin E. Hansen
By
ATTORNEY

DIRECTIONAL GRAIN CHUTES

In farm operations the transportation of loose grain by truck is well known, and such trucks are usually equipped with suitable end gates which can be opened for release of the grain from the truck. Some trucks are also provided with hydraulic lifting means for tipping the truck body to further facilitate the grain removal. When grain is to be dumped from such a truck into a predetermined container, the truck has to be backed up until the end gate is directly over such container, otherwise the grain will spill on the ground when dumped. Under such conditions the driver has to drive the truck backward and forward until this position is attained, and valuable time is lost.

The principal object of the present invention is: to provide a flexible apron for attachment of one side thereof to the rear end of a truck and under the end gate, and such that the lower corners of said apron can be adjustably suspended to form the apron into a chute by gravity, to direct grain escaping from under the end gate to any transverse position therebehind as desired, and so avoid excessive adjusting truck movement.

A further object of the invention is: to enclose said fastened side of the apron in a metal sheathing, through which the fastening means are passed, and so reinforce that side of the apron against tearing.

A further object of the invention is: to reinforce each of the free corners of the apron with a metal plate, each plated corner receiving one end of a lengthwise adjustable suspending cable, while the opposite ends of said cables are secured to the upper part of the truck, and such that the apron can fold into the chute mentioned above.

With the above important and other minor objects in view, which will become more apparent as the disclosure proceeds, the invention consists essentially in the design, construction and arrangement of the various parts hereinafter more particularly described, reference being had to the accompanying drawings wherein:

FIG. 1 is a perspective view of the rear end of a grain dump truck with the invention attached thereto, positioned into a chute, and directing grain into the hopper of a grain auger.

FIG. 2 is an enlarged perspective view of the apron in vertical position and showing the cables in the form of chains attached for suspending the lower corners.

FIG. 3 is a perspective view of one of the brackets on which the cables are adjusted.

In the drawings like characters of references indicate corresponding parts in the several figures.

The invention itself, see FIG. 2, comprises a rectangular-shaped apron 10 of flexible canvas material, preferably a rubberized composition, and having considerable tensile strength. A U-shaped strip of sheet metal 11, having inturned edges 12, encloses one edge of the apron and is clamped thereto for reinforcement, and said strip is provided with a series of spaced holes 13 therealong for a purpose later explained. A pair of spaced and parallel side edges extending from each end of said one edge terminate in a free edge which lies spaced and parallel to said one edge.

A pair of smaller U-shaped metal clips 14 partially enclose the two free corners of the apron, one adjacent at each corner and passing around the sides. These corners are at a junction of the side edges and the free edge. These clips are secured to the apron by rivets 15 at their corners, while a larger hole 16 passes centrally through the clip and the apron.

Two chains 17, preferably sash chains, form the cables and one end of each connect to one of the clips 14 with a snap fastener 18, the opposite ends being provided each with a ring 19. This completes the apron assembly.

The rear end of a tilted grain dump truck is generally indicated at 20 in FIG. 1 and is provided with a vertically slidable end gate 21 which rides in side guides 22, and is operable by a lever 23. When this lever is lifted, the end gate slides upwardly and grain flows thereunder from the truck, as shown at 24. A pair of angle-shaped brackets 25, best shown in FIG. 3, are mounted on the back of the truck, one on each upper outer side of the gate guides 22. The brackets are secured to the truck wall by rivets or bolts 26 through the holes 27 in one of the flanges, while the other outwardly projecting flange has a keyhole therein, as shown at 28.

The metal-reinforced side of the apron 10 is secured centrally, by fasteners 29 through the holes 13, to the bottom rear end of the above mentioned truck, and directly under the end gate. The rings 19 of the chains are removed and the loose chain ends are each passed up through one of said keyholes, and then the rings are reattached so the chains cannot escape. The apron itself normally hangs down loosely and swings below the end gate, when the truck is travelling.

When this grain truck is to be dumped, such as to a hopper 30 of a grain auger 31, shown in FIG. 1, the truck is backed up to the hopper. The chains 17 are then tightened and suitably locked in the narrow parts of the keyholes 28, so that the flexible apron is formed into a semi-circular chute 32, as shown in FIG. 1, and this chute may be central of the apron and pass directly back of the truck, or it may be directed to either side, according to how the chains are lifted to raise one or other of the apron corners higher. When the truck body is tipped and the lever 23 lifted so the end gate rises to start the grain flow thereunder, the grain falls into this formed chute and is directed right into the center of the hopper. Actually, in the present instance, the right hand chain 17 has lifted the right hand lower corner of the apron while the left hand corner is permitted slack and the chute so formed by the apron is directing the grain to the left of the end gate and directly into the hopper. Accordingly, truck time is saved in back and forth movement. Once the chains have been adjusted and set, which can be quickly done, the apron will permanently direct the grain in the set direction and requires no further attention. In other words; the truck just has to be backed once and the chute can be adjusted for correct delivery of the grain.

What we claim as our invention is:

1. A grain chute for use with a dump truck having an end gate in the rear side thereof; said chute comprising a substantially rectangular apron formed from flexible canvas-like material, said apron having an attaching edge, a pair of spaced and parallel side edges extending at right angles one from each end of said attaching edge, and a free edge extending between said side edges and lying spaced and parallel to said attaching edge, a U-shaped metal strip secured to said attaching edge in clinching relationship, securing said attaching edge to the rear side of the associated truck immediately below said end gate, a U-shaped bracket secured around said apron on each side edge thereof in clinching relationship and adjacent the corners formed by the junction of said side edges and said free edge, and a flexible cable secured by one end thereof to each of said U-shaped brackets and extending upwardly to be secured by the other end thereof to said rear side of the associated truck in spaced apart relationship and substantially vertically above each end of said attaching edge of said apron, and means to adjust the effective length of said cable independently of one another whereby the said corners of said apron may be elevated one relative to the other to form, by gravity, a flexible chute from said apron with the discharge end thereof being formed by said free edge and directed on one side or the other of said end gate depending on the adjustment of said cables.

2. The device according to claim 1 in which said means to adjust the effective length of said cables takes the form of a keyhole bracket secured to said rear side, said cables taking the form of chains detachably engageable through the keyholes formed in said brackets.

* * * * *